United States Patent

Schwendeman

[11] Patent Number: 5,274,840
[45] Date of Patent: Dec. 28, 1993

[54] SATELLITE COMMUNICATION SYSTEM

[75] Inventor: Robert J. Schwendeman, Pompano Beach, Fla.

[73] Assignee: Motorola, Inc., Schaumburg, Ill.

[21] Appl. No.: 783,726

[22] Filed: Oct. 28, 1991

Related U.S. Application Data

[63] Continuation of Ser. No. 432,269, Nov. 6, 1989, abandoned.

[51] Int. Cl.⁵ .................. A04B 7/195; A04Q 7/02
[52] U.S. Cl. ................... 455/13.1; 455/33.1; 455/54.1
[58] Field of Search ............ 371/68.1, 69.1, 35, 371/68.2; 455/12, 13, 33, 54, 67; 370/104.1, 13.1, 16; 340/988, 989, 990, 825.44, 311.1; 364/449, 460; 343/DIG. 2; 342/350, 354, 355, 356, 450, 457

[56] References Cited

U.S. PATENT DOCUMENTS

| | | | |
|---|---|---|---|
| 2,497,807 | 2/1970 | Newton | 455/13 |
| 3,349,398 | 10/1967 | Werth | 342/353 |
| 3,384,891 | 5/1968 | Anderson | 342/353 |
| 3,829,777 | 9/1974 | Muratani et al. | 370/16 |
| 3,876,980 | 4/1975 | Haemmig et al. | 371/69.1 |
| 3,986,167 | 10/1976 | Paul | 371/69.1 |
| 4,004,098 | 1/1977 | Shimasaki | 455/13 |
| 4,099,121 | 7/1978 | Fang | 455/12 |
| 4,541,095 | 9/1985 | Varies | 371/69.1 |
| 4,606,041 | 8/1986 | Kadin | 375/48 |
| 4,628,506 | 12/1986 | Sperlich | 455/12 |
| 4,718,066 | 1/1988 | Rogard | 371/35 |
| 4,924,699 | 5/1990 | Kenoda et al. | 340/990 |
| 4,956,641 | 9/1990 | Matai et al. | 340/825.44 |

Primary Examiner—Reinhard J. Eisenzopf
Assistant Examiner—Lisa Charouel
Attorney, Agent, or Firm—Thomas G. Berry; Daniel R. Collopy; Floyd E. Anderson

[57] ABSTRACT

A selective call receiver transmission system for transmitting a message to at least one selected selective call receiver of a plurality of selective call receivers comprises a transmitter for transmitting information including the message thereto. At least one satellite receives the information and transmits the message to the selective call receiver and subsequently retransmits the message from a different location to the selective call receiver.

12 Claims, 4 Drawing Sheets

SATELLITE COMMUNICATION SYSTEM

This is a continuation of application Ser. No. 07/432,269, filed Nov. 6, 1989 now abandoned.

FIELD OF THE INVENTION

This invention relates in general to a satellite communications system and more particularly to a selective call receiver satellite communications system providing an increased probability of reception by selective call receivers.

BACKGROUND OF THE INVENTION

Known satellite communications systems provide point-to-point communication. A satellite relays information received from a transmitter on earth, possibly through one or more other satellites, by retransmitting the information to an area on earth.

However, the retransmission strength is limited due to power limitations within the satellites. Since some receivers, i.e., selective call receivers, may be located in areas such as buildings in which the retransmission may not penetrate, not all retransmissions will be received.

Thus, what is needed is a satellite communications system providing an increased probably of reception by selective call receivers.

SUMMARY OF THE INVENTION

Accordingly, it is an object of the present invention to provide an improved satellite communications system.

In carrying out the above and other objects of the invention in one form, there is provided a method comprising the step of relaying, from two or more locations via at least one satellite, a transmission to a receiver.

DETAILED DESCRIPTION OF THE INVENTION

Figure 1:
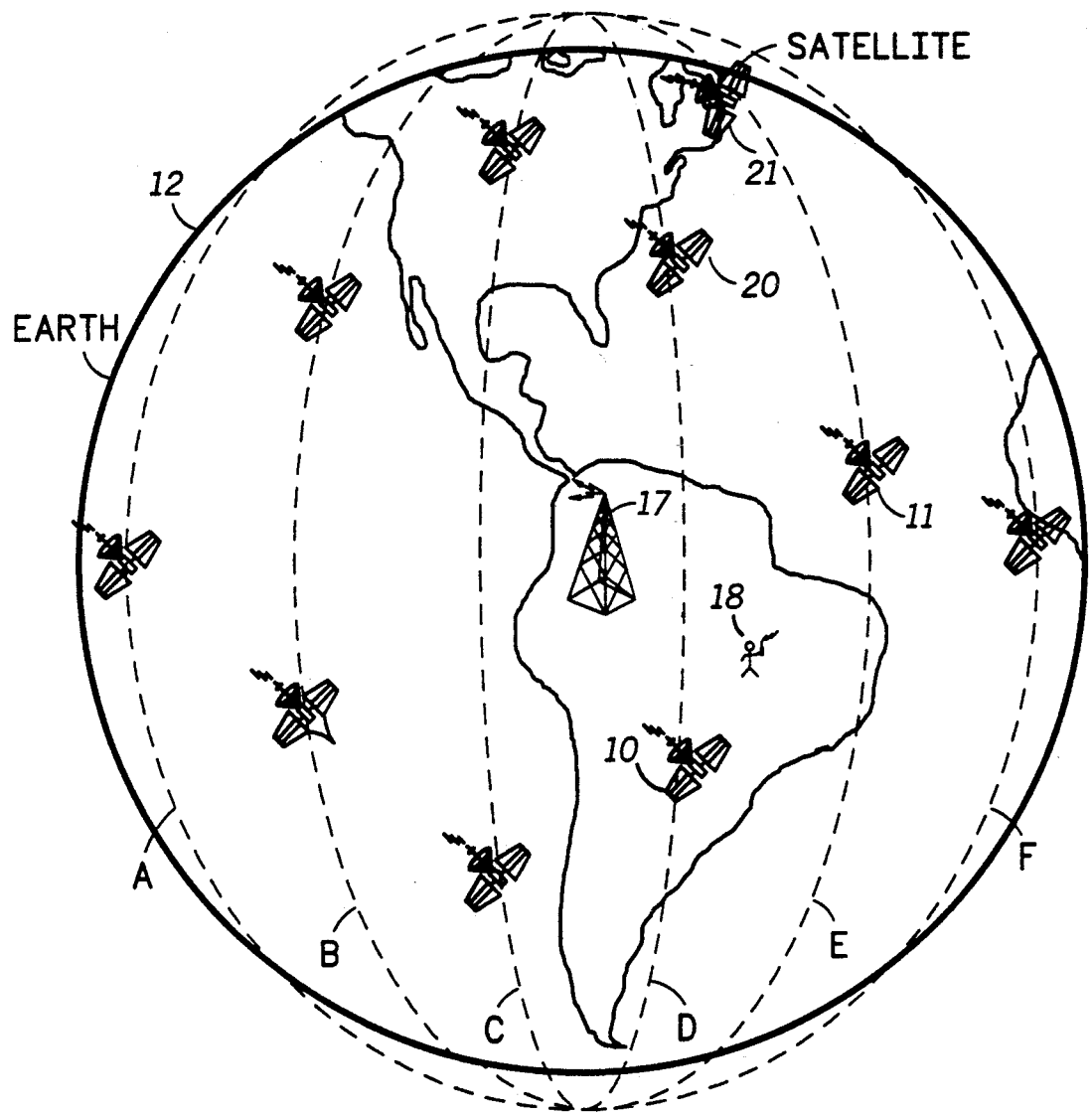
FIG. 1 is an illustration of a conventional plurality of satellites orbiting earth.

Referring to FIG. 1, a satellite configuration for a satellite communication system comprises a plurality of satellites, i.e, 10, 11, 20 and 21 in low earth orbit in one of a plurality of orbiting planes A, B, C, D, E, and F which are highly inclined in nature and provide comprehensive communication coverage for the earth 12.

In the highly inclined orbit configuration of the preferred embodiment, satisfactory earth coverage could be accomplished with forty-eight low-earth orbiting satellites. These satellites could be arranged in six highly inclined orbiting planes, eight satellites per plane. Other configurations could be used. Other lower inclined orbiting arrangements would require substantially more satellites in order to achieve the same coverage of the earth as the highly inclined configuration.

Figure 2:
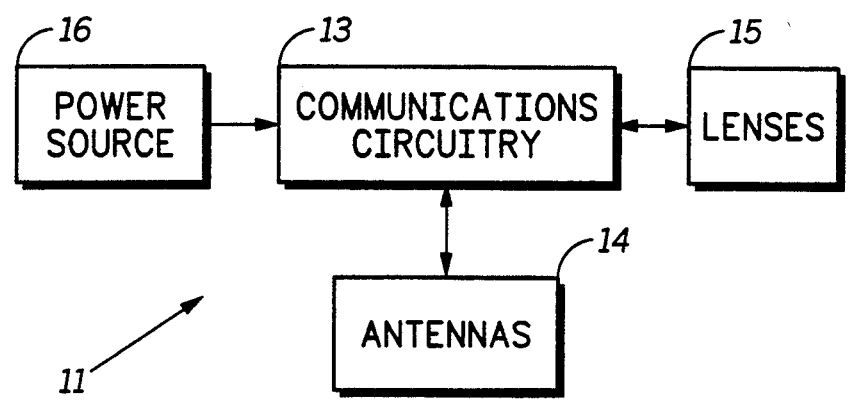
FIG. 2 is a block diagram of components within a satellite.

Referring to FIG. 2, each satellite 10, 11, 20 and 21 contains satellite communications circuitry 13, suitable antennas 14 and 15, i.e., helicals antennas for up/down links and lenses for cross links, respectively and an unfolding array of solar cells 16 along with storage batteries connected to the solar cells to provide power for the communications system. The solar cell array 16 is opened after being placed in orbit by a launching vehicle and the communications system thereby activated. The communications systems are then individually brought on line via standard telemetry, tracking and control channels to form a network The satellite communication system described herein provides spectral efficiency: the same frequency may be simultaneously used by different satellite communication systems. Each satellite 10, 11, 20 and 21 acts as a platform for relaying a transmission from a transmitter 17 to a receiver 18. The transmitters and receivers may be located on the ground, on a vehicle in the air or on the water, in different parts of the globe, etc.

In the present invention, a plurality of receivers 18, such as selective call receivers including pagers, are relatively fixed in position at any given time while the satellites 11 are in continuous movement. Although the user of a receiver 18 may "roam", this distance is relatively small compared to the traveling distance of the satellite overhead. Each satellite communications circuitry 13 comprises a microprocessor for determining how the transmission is to be relayed to the appropriate receiver 18 in a manner to be described hereinafter.

Conventional satellite systems could increase the probability of reception by increasing the transmission power of the satellite; however, this method is limited by the average power available to the satellites from the solar cells. Furthermore, once the signal is subjected to the multipath reflection environment of an urban area, the signal level at a given distance from the transmitter generally varies as a log normal distribution at a given distance from the transmitter. The variance (sigma) of this distribution is often around eight decibels (db). In order to increase the percent success from fifty percent to seventy five percent would require 0.7 sigma additional power or 5.6 db. However, one uncorrelated repeat would give the same results with an equivalent energy increase of only three db. To improve from ninety percent success to ninety nine percent success would require 1.1 sigma power or 8.8 db; however, one uncorrelated repeat would have the same effect for a savings of 5.8 db of energy.

Figure 3:
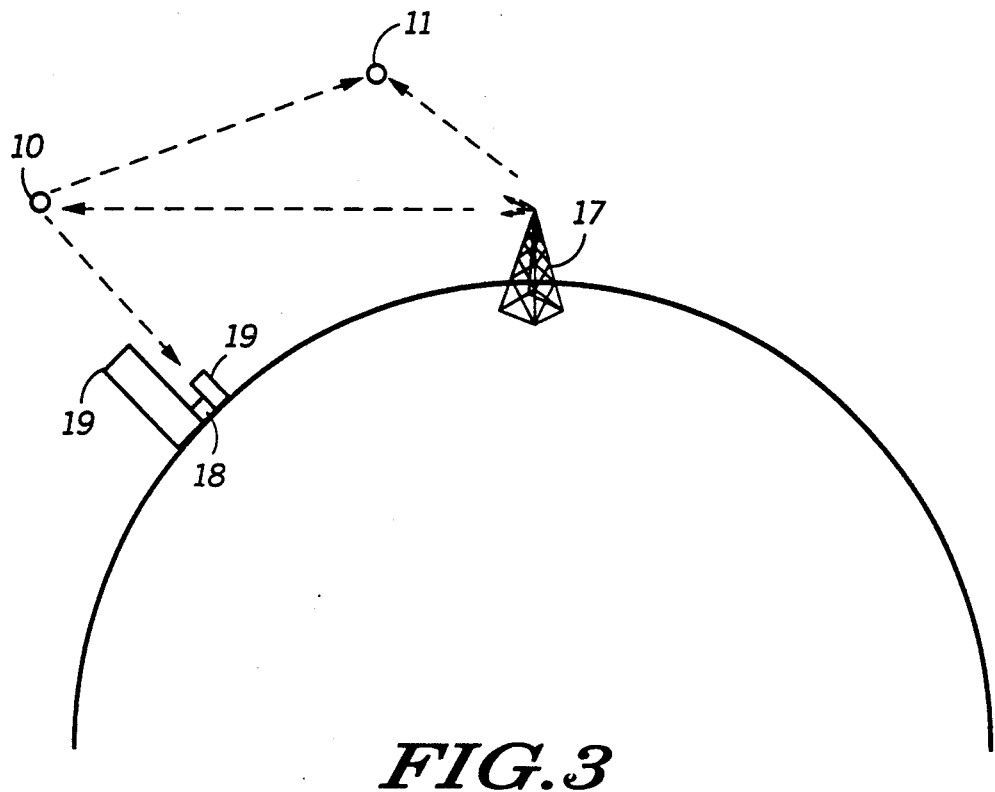
FIG. 3 illustrates two satellites in orbit above earth receiving and retransmitting a signal in accordance with the preferred embodiment at a first point in time.
Figure 4:
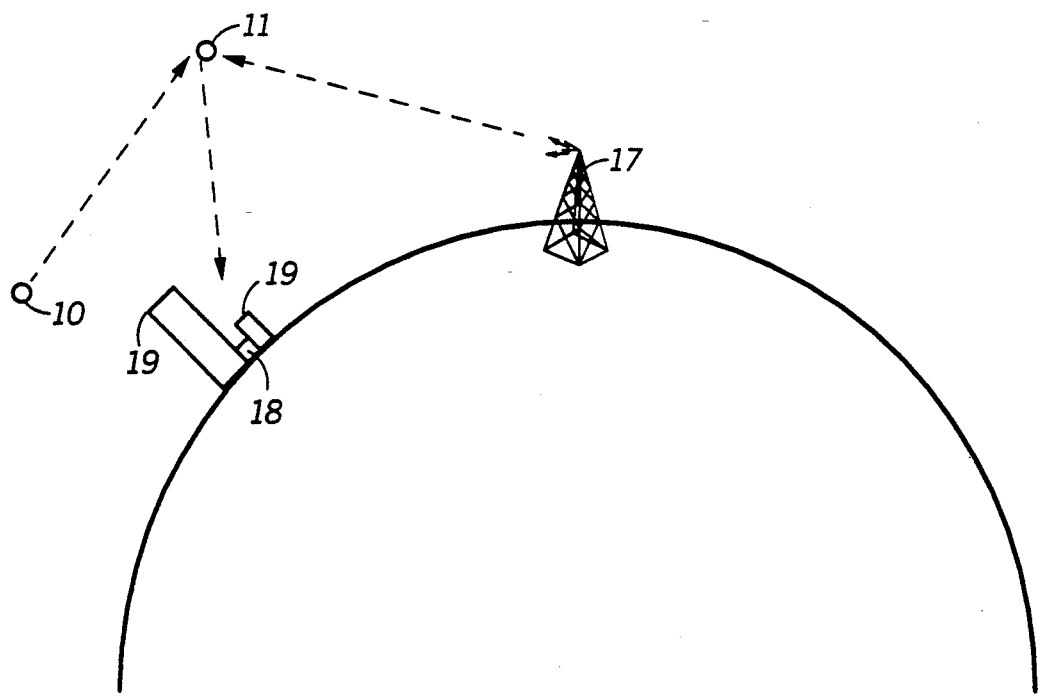
FIG 4 illustrates two satellites in orbit above earth receiving and retransmitting the signal in accordance with the preferred embodiment at a second point in time.

Referring to FIGS. 3 and 4 and in accordance with the present invention, the receiver may be located in an area of limited reception, such as between buildings 19. At a first point in time (FIG. 3), information is transmitted from the transmitter 17 to the satellite 10, which is then relayed (retransmitted) down to the receiver 18. Further, the information may be transmitted to the satellite 11, either from the transmitter 17 or relayed from the satellite 10. At a second point in time (FIG. 4), the satellite 11 retransmits the information to the receiver 18 from a location different than the location from which satellite 10 previously retransmitted. The information may be transmitted to the satellite 11 at the second point in time by the transmitter 17 or from satellite 10 or from another satellite. The first and second points in time may differ from a few seconds to several minutes, for example. The probability of reception of the information by the receiver 18 is increased since the receiver receives the transmissions from different angles. These different angles generally have different multipath reflections, creating different signal levels at the point of reception. The system selects which satellite (the general direction from which the signal is received) and at what time (the angle of incidence) the relay is accomplished, thereby maximizing the probability of reception. The system performs these decisions through known computer optimization techniques and is preferably located on the ground, but may alternatively reside in one or more of the satellites. Furthermore, since the receiver 18 may change its position within the transmission area between the first and second points in time, the probability of reception may be further increased. In the preferred embodiment, the information transmitted in the first and second messages is identical; however, in a second embodiment, the second message may comprise only a portion of the first message.

Figure 5:
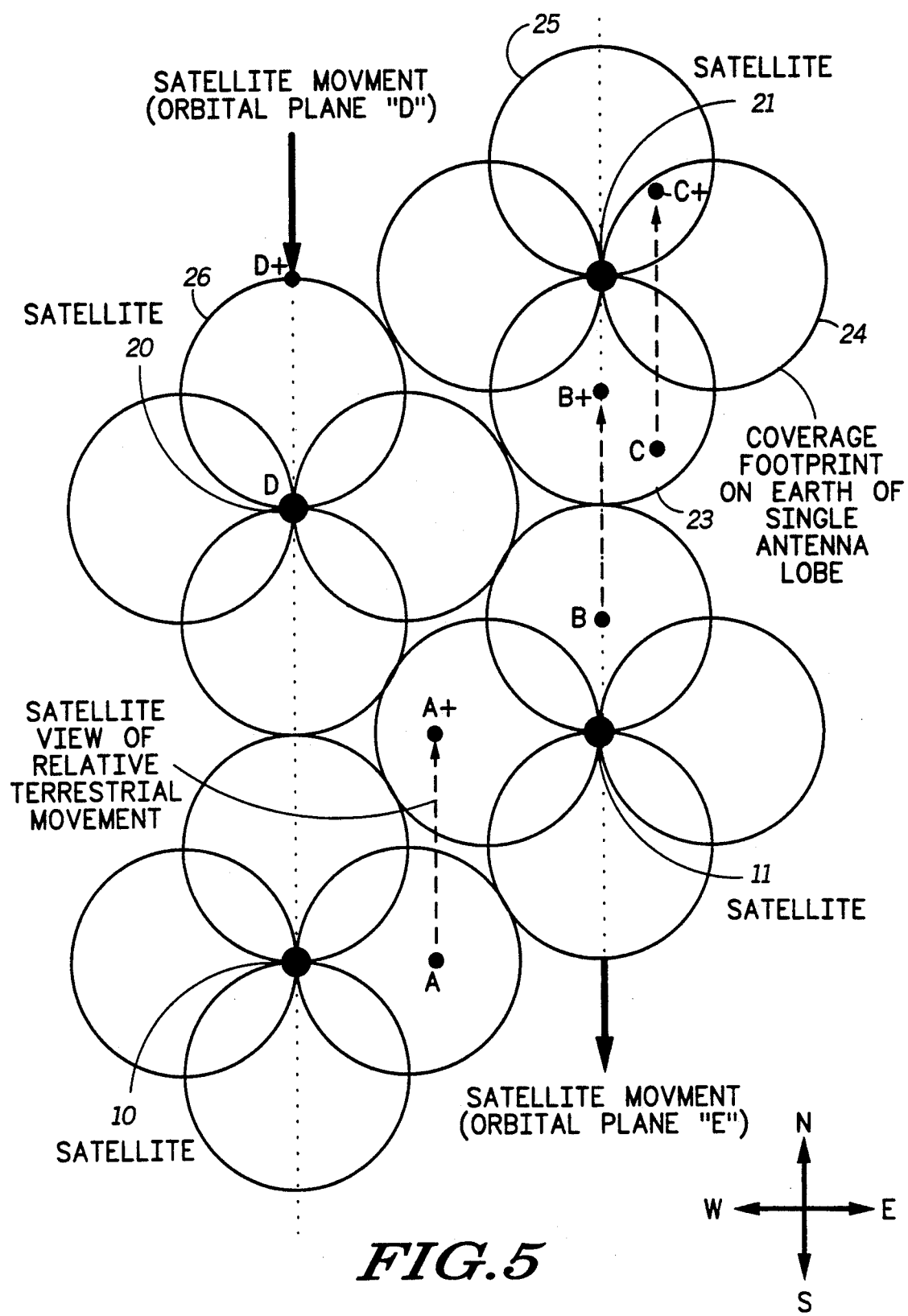
FIG. 5 illustrates radio antenna lobes of two orbiting satellites in accordance with the preferred embodiment.

Referring to FIG. 5, each of the satellites typically may project four or more lobes (generally shown as circularly areas) onto the earth which are achieved via antennas 14 with fixed beam widths appropriate to the number of lobes. Although the lobes are illustrated as four circles, it would be understood by those skilled in the art that the lobes could comprise various shapes and numbers. The satellites 10 and 20 are in a north to south polar orbit "E" and the satellites 11 and 21 are in a north to south polar orbit "D", although other orbits including opposing orbits could be used. Four examples are illustrated for describing how the satellites 10, 11, 20 and 21 retransmit the information, wherein the letters A, B, C and D represent the receiver 18 at the first point in time and the letters A+, B+, C+ and D+ represent the receiver 18 at the second point in time. Initially, the transmitter 17 sends the information to an overhead satellite which could be any one of the satellites in the particular orbit near the transmitter 17. In the case shown in FIG. 1, the transmitter 17 may send the information to the satellite 10 for retransmission to the receiver 18 at "A". The user of the receiver 18 would have previously informed the system of the receiver's location, i.e., within a particular city. At the second point in time after the satellite 11 has moved further south, the information is retransmitted from the satellite 11 to the receiver 18 at "A+". The information may be passed through several satellites from the transmitter 17 before being transmitted to the receiver 18. In a like manner, example "B" illustrates the transmissions from two satellites 11 and 21 in the same orbit, example "C" illustrates the transmissions from two lobes 23 and either 24 or 25 from the same satellite 21, and example "D" illustrates the transmissions from the same lobe 26 from the same satellite 20. The information may be passed to the second satellite 11 during either the first or second point in time and from any one of several sources such as any satellite or the transmitter 17.

In summary, by relaying the information from two different locations (angles) at different points in time, the probability of reception by a receiver 18 is increased.

I claim:

1. A satellite communications system for transmitting information to a receiver, comprising:
    transmitter means for transmitting the information; and
    processor means for calculating first and second locations;
    satellite means for, subsequent to calculating the first and second locations, receiving and retransmitting the information to the receiver from the calculated first location, and for increasing the probability of the information being received by the receiver by subsequently retransmitting the information to the receiver from the calculated second location.

2. The satellite communications system according to claim 1 wherein the satellite means comprises a single satellite.

3. The satellite communications system according to claim 1 wherein the satellite means comprises a first satellite for retransmitting the information and a second satellite for subsequently retransmitting the information 4. The satellite communications system according to claim 3 wherein the transmitter means transmits data to the satellite means indicating the location of the receiver, the satellite means determining when the subsequent retransmission is to be made.

5. The satellite communications system according to claim 3 wherein the second satellite receives the information from the first satellite.

6. A selective call receiver transmission system for transmitting a message to at least a selected one of a plurality of selective call receivers, comprising:
    transmitter means for transmitting information including the message; and
    satellite means for receiving the information and transmitting the message from a first location to the selective call receiver and subsequently re-transmitting the message from a different calculated location to the selective call receiver.

7. A satellite system for increasing the probability of a plurality of signals from a transmitter being received by a plurality of receivers, comprising:
    at least one satellite for receiving the signals from the transmitter and effecting first and second transmissions for each of the signals from first and second locations respectively; and
    programming means coupled to the at least one satellite for determining the first and second locations of each signal transmission by timing the transmission of the plurality of signals with respect to the angle of incidence at the receivers.

8. The satellite system according to claim 7 wherein the transmitter transmits data to the at least one satellite indicating the first and second locations.

9. In a satellite system for increasing the probability of a signal being received by a receiver from a transmitter, the method comprising the steps of:
    transmitting at a first time the signal from the transmitter to at least one satellite;
    transmitting at a second time the signal from the at least one satellite in a first location to the receiver;
    determining a second location from which the second transmission will be made; and
    re-transmitting at a third time subsequent to the second time the signal from the second location.

10. The method according to claim 9 further comprising the step of transmitting data to the at least one satellite indicating the first and second locations.

11. A satellite system for increasing the probability of a signal being received by a receiver from a transmitter, comprising:

at least one satellite for receiving the signal from the transmitter and effecting first and second transmissions; and programming means coupled to the at least one satellite for determining first and second points in time in which the at least one satellite effects the first and second transmissions, respectively.

12. The satellite system according to claim 11 wherein the transmitter transmits data to the at least one satellite indicating the first and second points in time.

* * * * *